March 22, 1966 G. F. G. CLOUGH 3,241,820
APPARATUS FOR THE AERATION OF LIQUIDS
Filed Dec. 11, 1962
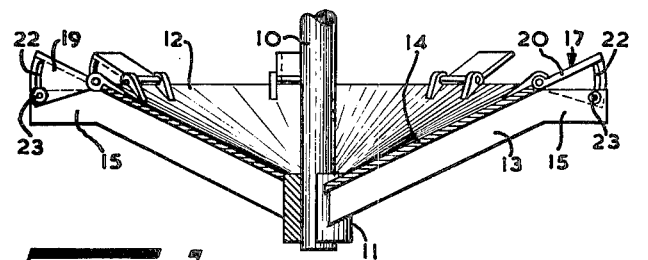
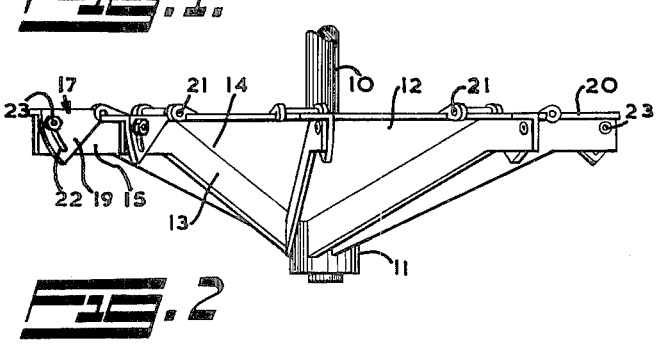
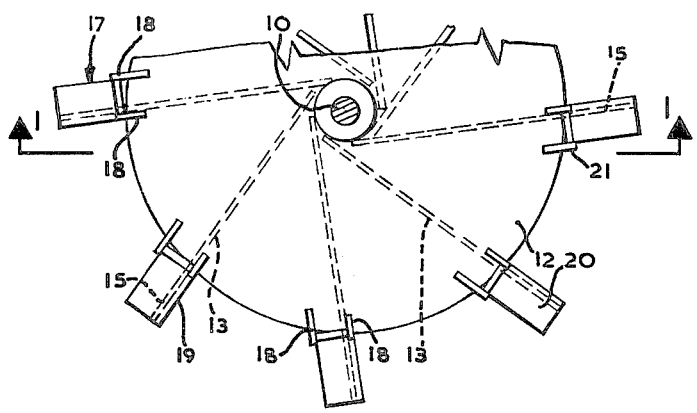
Inventor:
George Francis Gilbert Clough
by Benj. T. Rauber
attorney

United States Patent Office 3,241,820
Patented Mar. 22, 1966

3,241,820
APPARATUS FOR THE AERATION OF LIQUIDS
George F. G. Clough, Macclesfield, England, assignor to Simon-Carves Limited, Stockport, England, a British company
Filed Dec. 11, 1962, Ser. No. 243,808
5 Claims. (Cl. 259—134)

This invention relates to the aeration of liquids and is an improvement in, or a modification of, the invention described in a co-pending application of Charles R. Alsop, Serial No. 158,672, filed December 12, 1961, and now matured into U.S. Letters Patent No. 3,182,972 issued May 11, 1965.

The above application describes and claims an agitator for the aeration of liquids, comprising an inverted frusto-conical shell secured adjacent the lower end of a spindle, to the lower end of which is secured an annular boss, a plurality of arms secured to the periphery of said annular boss and extending tangentially of said boss along the lower surface of said frusto-conical shell to the periphery thereof and thence horizontally in fixed position outwardly, and a deflector secured to the outer end of each said arm at right angles thereto, on the upper edge thereof and extending from the outer periphery of said shell to the outer end of each said arm, said deflectors being adapted to lie parallel with, and at substantially the same level as, the surface of the liquid in a container when said agitator is rotated therein for the aeration of said liquid.

The above aerator or agitator operates to perform two main functions, in that it enables ambient gases to be absorbed by the liquid in which it is operated, or it permits gases dissolved in that liquid to be liberated to the atmosphere. It also causes a toroidal circulation of the liquid in the vessel in which it is operated.

Any one of these functions may be predominantly desirable for a given set of circumstances. Our present invention provides means whereby the agitator may be adjusted to produce predominantly any of the desired functions. We have discovered that this may be accomplished by changing the position of the deflectors to a selected angle to the horizontal.

According to the present invention, therefore, an agitator of the type disclosed in the above application for the aeration of liquids comprises means whereby the deflector secured to the outer end of each arm of the agitator may be adjusted so that said deflector may be secured at an angle to the surface of the liquid in said container.

But a better understanding of the invention may be obtained from the following description when this is read with reference to the accompanying drawings, of which:

FIG. 1 is a sectional elevation of an agitator embodying the invention taken on the line 1—1 of FIG. 3.

FIG. 2 is an elevation of the agitator and

FIG. 3 is a partly broken top plan view thereof.

As shown in the drawings, the agitator or aerator comprises a spindle 10 having secured at one end thereof an annular boss 11. A shallow metal frusto-conical shell 12 has its inner periphery secured to the upper end of the annular boss 11 with its outer periphery directed away therefrom.

A plurality, for example six or eight, of arms 13 are secured tangentially to the periphery of the boss 11 at such an angle that their upper edges follow the contour of the outer surface of the frusto-conical shell 12, to which they are also secured. The arms 13 are thin, flat metal strips, secured by their flat surfaces to the boss 11 and by their upper edges to the shell 12. Each arm 13 extends for a distance beyond the outer periphery of the shell 12 and is there turned so that in the extension 15 from the outer periphery of the shell to its end it lies parallel with the plane of the outer peripheral edge of the shell 12.

Between the outer peripheral edge of the shell 12 and the outer end of each extension 15 a deflector 17 is pivotally secured between ears 18 secured to the inside 14 of the shell 12 adjacent its peripheral edge. Each deflector 17 comprises a short angle-section mounted so that one of its webs 19 lies substantially-vertical adjacent and parallel with the vertical web of the extension 15 of each arm 13, and its other web 20 lies substantially-horizontal and directed over the extension 15 of the arm.

Each deflector 17 is pivoted between the ears 18 so that it may be moved through a vertical plane parallel with, and through a vertical angle relative to, the extension 15 of its arm 13. The outer end of the vertical web 19 of the deflector 17 is preferably arcuate on the radius of its pivot 21, and, slightly inwardly of its arcuate outer end, it is provided with an arcuate slot 22 in which is located a locking bolt 23 secured in the vertical web of the extension 15 of the arm 13.

The location of each deflector 17 is such that, when in its lowest angular position, it is resting on the upper edge of the extension 15 of its arm 13, and is lying substantially parallel with the surface of the liquid in the container (not shown), when the agitator is inserted therein. The extent of the arcuate slot 22 is such that the deflector 17 may be pivoted upwards until its horizontal web 20 lies substantially parallel with the upward slope of the shell 14.

It may be locked in either of these positions or in any intermediate position, by the bolt 23 engaged in the arcuate slot 22. One such deflector 17 is applied to each arm 13.

As no attachments are required beneath the liquid level of a storage tank or other container, the agitator or impeller, when supplied with suitable rotating means, can be applied to any liquid container of suitable size and as such can be used as a portable agitator for selective use in a plurality of such containers.

It may, however, be an integral part of a liquid tank or other container.

In either event the agitator will be inserted in the liquid so that the upper edge of the conical shell 14 and the deflectors 17 lie at, or slightly above, the level of the liquid in the tank or other container and will be fitted with suitable means for causing its rotation, e.g., belt or gear drive or an electric motor.

The deflectors 17 will be adjusted to suit the purpose for which the agitator is to be used, it being appreciated that the greater the angle of the deflectors 17 relative to the surface of the liquid, the greater will be the surface agitation.

In operation, the agitator is rotated at speeds preferably between 50 and 100 r.p.m. Due to the tangential aspect of the arms 13 relative to the annular boss 11, and the upward angle of the lower surface 14 of the shell, liquid is drawn upwards and outwards along the lower surface of the cone 12; the angles of the deflectors 17 controlling the trajectory and agitation of the liquid.

During rotation, the flow of liquid is upwards and outwards so that a substantially toroidal liquid circulation develops and the whole of the liquid is progressively circulated through the air in the zone of turbulence at the surface thereof.

Although not in any way limited to such use, the invention is particularly adapted for the aeration of effluent liquor in the bacterial effluent treatment plant of our British Patent No. 847,640.

Having described my invention, I claim:

1. An agitator for the aeration of liquids which comprises a spindle, an inverted frusto-conical shell mounted on said spindle, agitator arms secured to the under surface of said shell and extending from the inner periphery of said shell to the outer periphery thereof and thence outwardly in a horizontal direction and a deflector for each said agitator arm overlying the extending part of said agitator arm, means movably mounting said deflector on said shell for locating said deflector in an adjusted position wherein it extends radially and upwardly at a selected angle on said shell at an angle radially and upwardly from said extending part of said agitator arm, and means for securing said deflector in said adjusted position, said deflector having a part lying alongside said agitator arm and a part extending sidewise of and above said agitator arm.

2. An agitator for the aeration of liquids which comprises a rotatable spindle, an inverted frusto-conical shell mounted on said spindle at the lower periphery of said shell, a boss fixed on said spindle, flat agitator plates secured at their upper edges to the under surface of said shell and extending tangentially of said boss from said boss to the outer periphery of said shell and thence projecting horizontally beyond said shell, said horizontally projecting part having a vertical face, a deflector for each said agitator arm, said deflector being of angle section and having a vertical web alongside the vertical face of said horizontally projecting part of its respective agitator plate and a web extending from the upper edge of said vertical web at an angle to said vertical web and means pivotally mounting said deflector on said shell to tilt on a horizontal axis upwardly and outwardly from a horizontal position.

3. The agitator of claim 2 comprising means to secure said deflector in positions of tilting.

4. The agitator of claim 3 in which the vertical web of each said deflector has an arcuate slot centered on the pivoting axis of said deflector and in which said securing means comprises a bolt passing through the extending part of the respective agitator plate and through said arcuate slot.

5. The agitator of claim 4 in which said means for pivotally mounting each said deflector on said shell comprises a pair of parallel ears mounted on the inner surface of said shell, a pair of complementary ears on the deflector and a pivot pin extending through said ears.

References Cited by the Examiner

UNITED STATES PATENTS

| 1,503,755 | 8/1924 | Harrison | 261—84 |
| 1,584,043 | 5/1926 | Shepard | 261—91 |
| 1,859,770 | 5/1932 | Fleisher | 239—215 |
| 2,319,752 | 5/1943 | Smith et al. | 261—84 |
| 2,766,071 | 10/1956 | Flury | 239—217 |
| 2,796,241 | 6/1957 | Lhota | 261—91 |

FOREIGN PATENTS 1,205,301   8/1959   France.

HARRY B. THORNTON, *Primary Examiner.*
RONALD R. WEAVER, *Examiner.*